Sept. 13, 1932.  C. R. FREDSELL  1,877,233
CORK FEEDING AND INSERTING MACHINE
Original Filed Feb. 19, 1927   6 Sheets-Sheet 1

Sept. 13, 1932.  C. R. FREDSELL  1,877,233
CORK FEEDING AND INSERTING MACHINE
Original Filed Feb. 19, 1927  6 Sheets-Sheet 3

Inventor
C. R. Fredsell
By his Attorney Wm H Reid

Sept. 13, 1932.   C. R. FREDSELL   1,877,233
CORK FEEDING AND INSERTING MACHINE
Original Filed Feb. 19, 1927   6 Sheets-Sheet 4
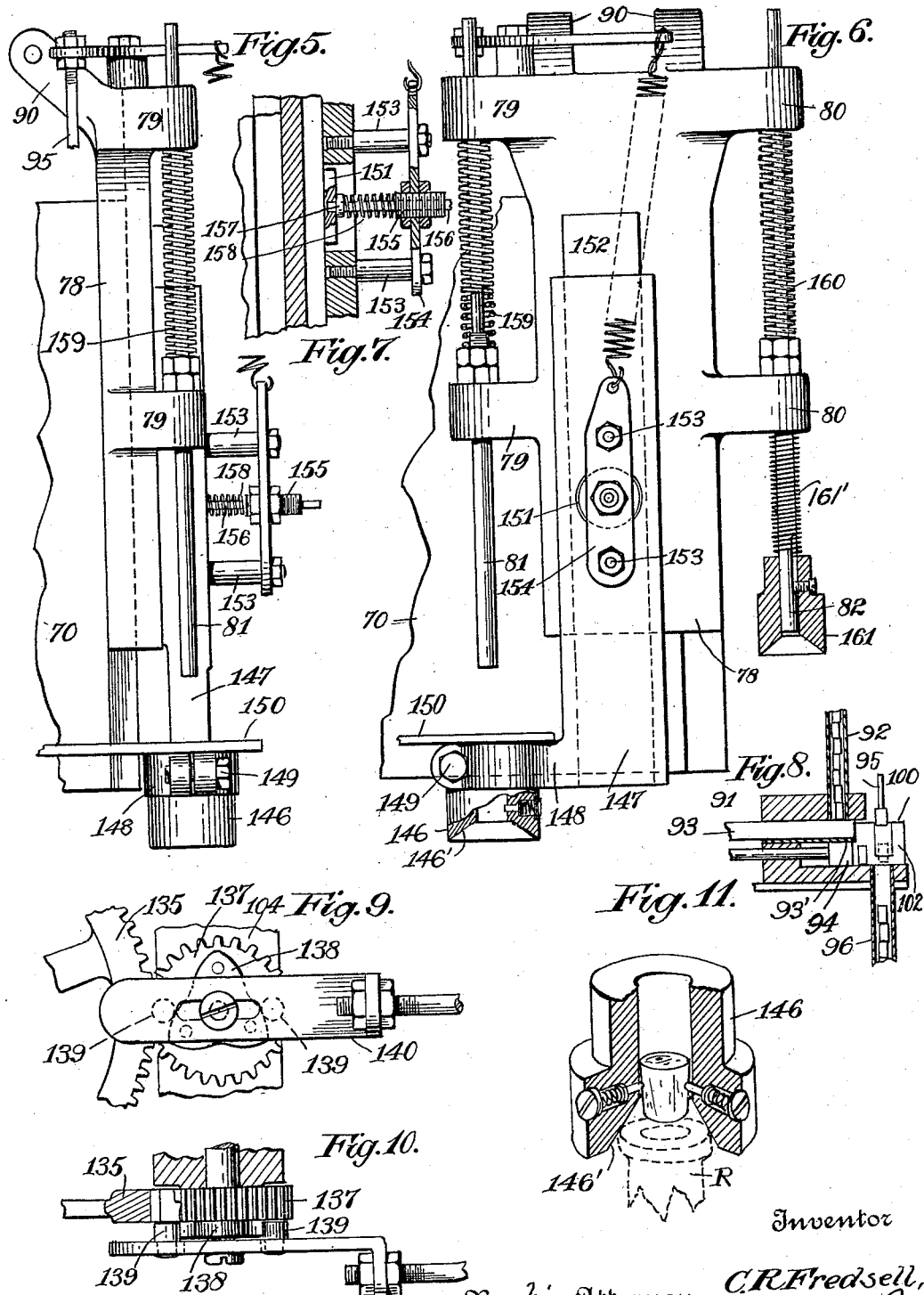
Inventor
C. R. Fredsell,
By his Attorney
Wm H Reid Sept. 13, 1932.  C. R. FREDSELL  1,877,233
CORK FEEDING AND INSERTING MACHINE
Original Filed Feb. 19, 1927  6 Sheets-Sheet 5
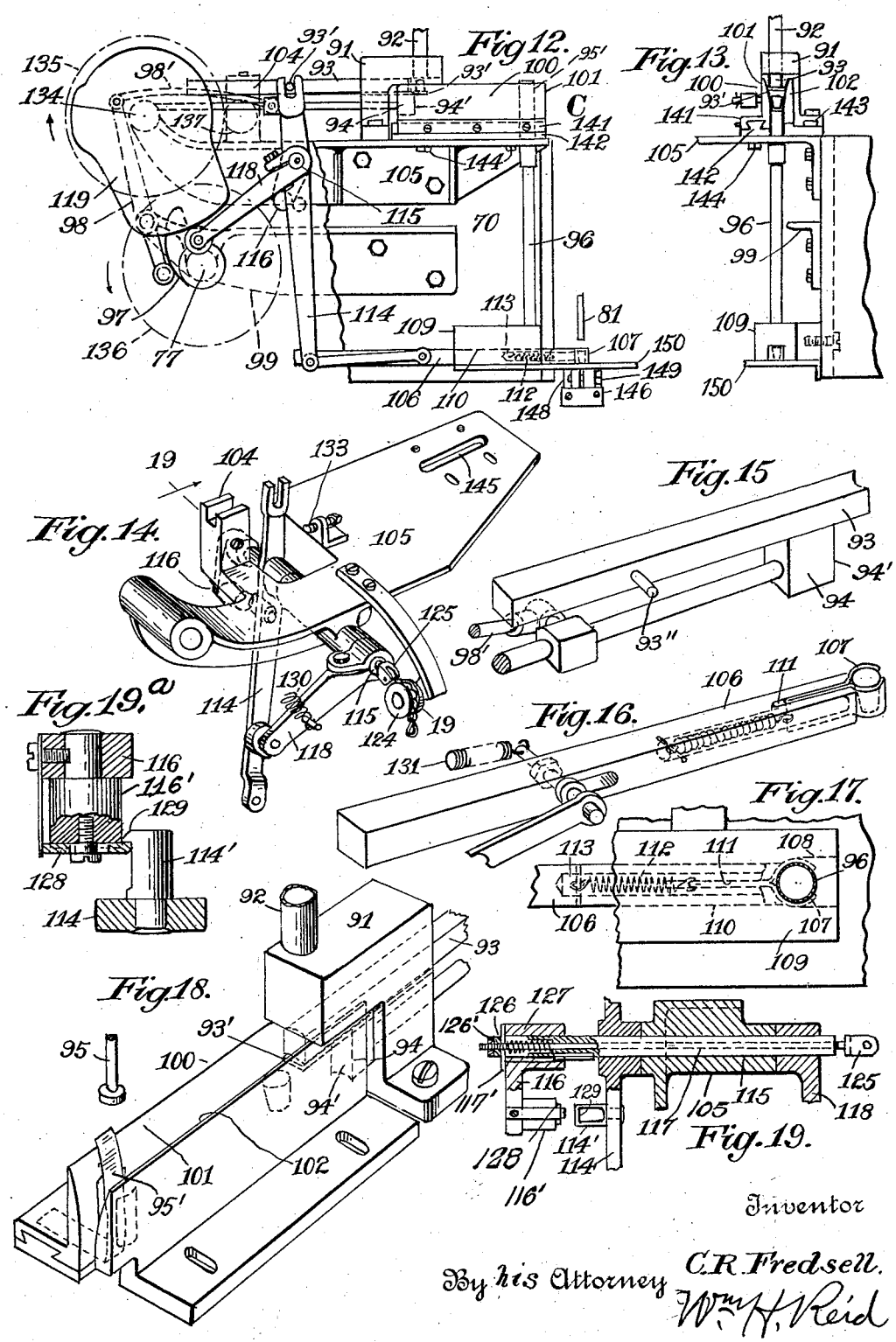
Inventor
C.R. Fredsell.
By his Attorney
Wm H. Reid

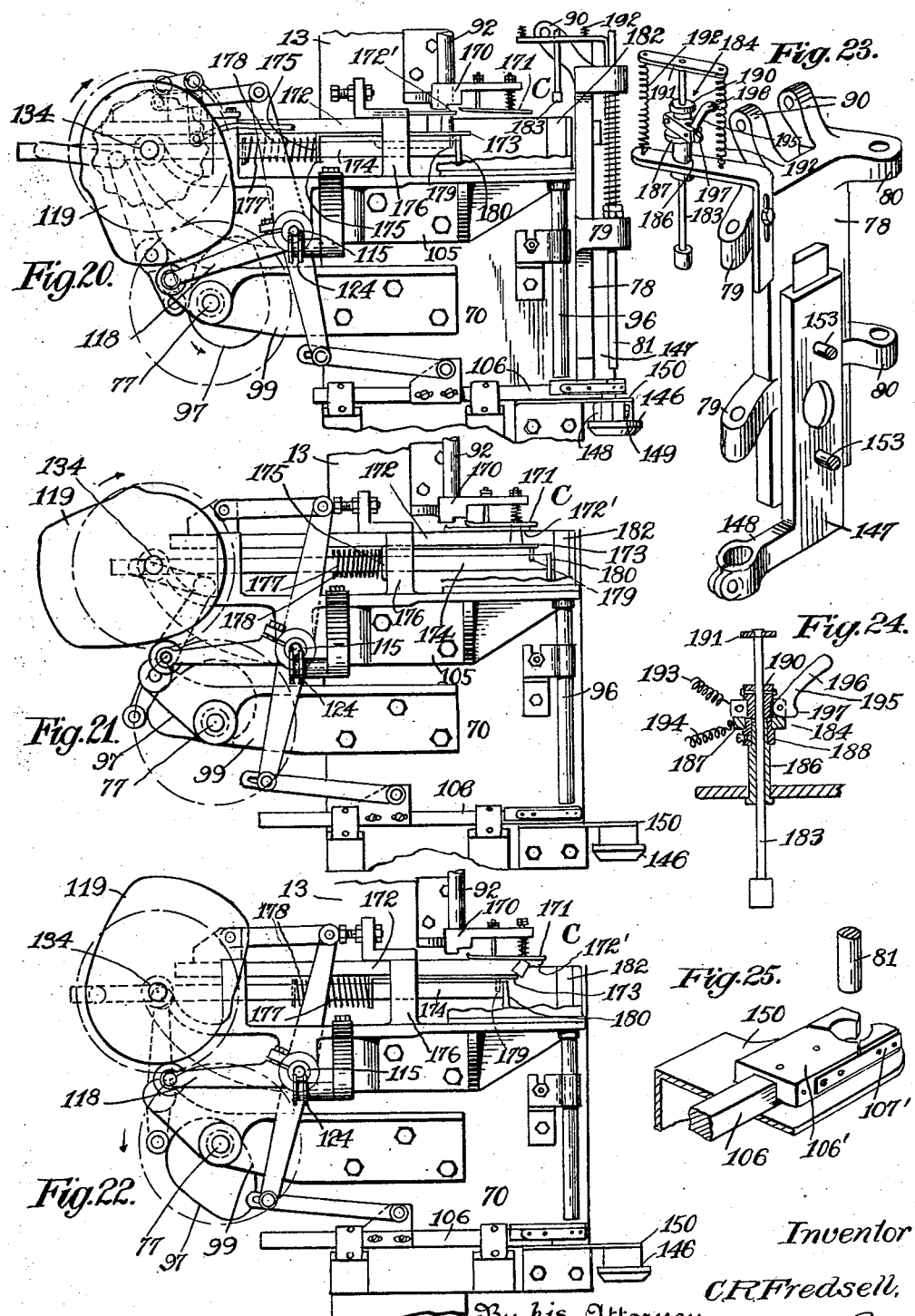

Patented Sept. 13, 1932

1,877,233

UNITED STATES PATENT OFFICE

CHARLES R. FREDSELL, OF BROOKLYN, NEW YORK

CORK FEEDING AND INSERTING MACHINE

Application filed February 19, 1927, Serial No. 169,667. Renewed July 29, 1932.

This invention relates to cork feeding and inserting machines. The machine is designed to feed tapered corks from a hopper in single file. Usually such corks are longer than their diameter, and pass down a tubular runway of such size to lead the corks either end up, that is, either end of the tapered portion, and ejected from the lower end of this runway into a rectifying chamber wherein the corks are brought to the correct position for entrance into the receptacles to be corked, the tapered small ends down, and moved forward in this chamber in line with a plunger which forces the cork into a magazine in the nature of a storage tube to hold sufficient corks from which a single cork is removed from the lower end by an ejector which also pushes the cork into alignment with a cork inserting plunger. Having this storage tube hold a supply of corks enables the machine to continue in its operation should there be a failure to introduce a cork into the chamber from the hopper by the first mentioned ejector. The inserting plunger is located at a station to which the receptacles to be corked are brought by a rotating support in timed relation with respect to the foregoing cork feed means.

It is an object of the invention to provide a simple and effective means to automatically feed, rectify and sort the corks before reaching the plunger that inserts them in the receptacles.

Another object is to provide means for arresting the machine in case a cork becomes wedged in entering the storage tube which is supplied by shifting the corks forward in the rectifying chamber under a yielding plunger, to be there impinged under a spring tension member until this plunger descends to force it into the storage tube, and thereby the corks preceding it to the bottom thereof. The plunger co-acts with an electric switch to open the circuit should the corks become wedged under this plunger and stop the machine. Provision is also made for irregular corks, such as undersized corks, to be free to pass out of the rectifying chamber just prior to reaching the plunger and the stoppage or otherwise choking of the machine is prevented.

It is a further object to provide means that will reliably feed the corks to the receptacles in rapid succession without injury to the corks in a manner that will reduce the liability of idle feed movements to a minimum, and thereby retain a greater supply of corks in the storage tube.

A further object is to provide means whereby the feed of corks to the inserting plunger is prevented when a receptical to be corked is not in position under the inserting plunger or in transit to such position.

A further object is to provide adjustment of the parts to enable corks and receptacles of larger or smaller dimensions to be fed, also corks having even diameters at both ends may be fed in which case the rectifying chamber may be supplied with straight side walls.

In the accompanying drawings showing embodiments of my invention:

Fig. 5 is an enlarged side view of the plunger slide.

Fig. 6 is a front view of the slide.

Fig. 7 is a detail of a friction member forming a part of the slide.

Fig. 8 is a view of a straight sided cork feeding chamber.

Figs. 9 and 10 show in side elevation and plan a portion of vibrating mechanism for freeing the corks in their passage in the rectifying plates.

Fig. 11 is a perspective view of a spring pressed cork holder and bottle centering member.

Fig. 12 is a view similar to Fig. 3 but showing a different position of its parts.

Fig. 13 is an end view of parts shown in Fig. 12.

Fig. 14 is a perspective view of a clutch member.

Fig. 15 is a perspective view of the upper cork feed slides.

Fig. 16 is a perspective view of the lower cork feed slides.

Fig. 17 is a plan of the lower slide in its bearing block.

Fig. 18 is a perspective view of the rectifying block and slide supporting frame.

Fig. 19 is a cross sectional view of the clutch arm, section taken on line 19—19 of Fig. 14.

Fig. 19a is a detail view of a clutch member.

Figs. 20, 21 and 22 are position views similar to Figs. 3 and 12, but showing another form of the feed slides.

Fig. 23 is a plunger means for detecting a jammed cork and connected to a safety device to stop the machine.

Fig. 24 is a detail of the safety means.

Fig. 25 is a detail of a slide.

The present invention comprises a train of automatic mechanism including a passageway from a hopper through which the corks are directed length-wise of their axis irrespective of their large or small ends. The lowermost cork of the passage is ejected into a rectifying chamber of channel form having tapered side walls, one of which is reciprocated to assist and quicken the action of the corks in righting themselves so that their largest diameter is at the top. In this position they are moved forward in the channel to be in alignment with the entrance of a magazine and there impinged to be later acted upon by a plunger to force the same into the magazine to provide a supply of sorted and rectified corks, undersized corks, or particles passing out of the channel through an elongated opening in a supporting bracket between the channel walls through which such inferior product may be discharged before reaching the magazine entrance, thereby insuring perfect corks entering the magazine. The latter is of such length to accommodate a sufficient supply of corks for practically continuous operation of the plunger which inserts them into the receptacle, the corks being ejected from the lower end of the magazine by an ejector to be positioned thereby under this plunger. When an undersized cork is discharged through the opening between the channel walls, the supply of corks, due to this condition, would be one less in the magazine for each occurrence and the supply would be materially lowered should this occur frequently. This, however, is not the case: the magazine is of such length to insure practically a continuous supply by having this supply of corks in readiness for each stroke of the inserting plunger. The receptacles are fed to the inserting plunger by an intermittently rotary carrier, having pockets therein, which when brought to rest receives a receptacle in one pocket thereof from a supply belt. At the same time a pocket at the location of the inserting plunger holds a receptacle which receives a cork from the magazine and a second plunger at another pocket of the carrier which provides a finishing impression to that received at the first inserting plunger position, and a pocket preferably diametrically opposite the receiving pocket from which the corked receptacles are removed by a discharge belt. During the movement of the receptacle to the first inserting plunger, the receptacle engages a clutch operating lever which effects the feed stroke of the cork ejectors from the runway into the channel chamber, and from the magazine to the inserting plunger, both these ejectors becoming inoperative when there is no receptacle in the rotating carrier under the inserting plunger.

Figure 1:
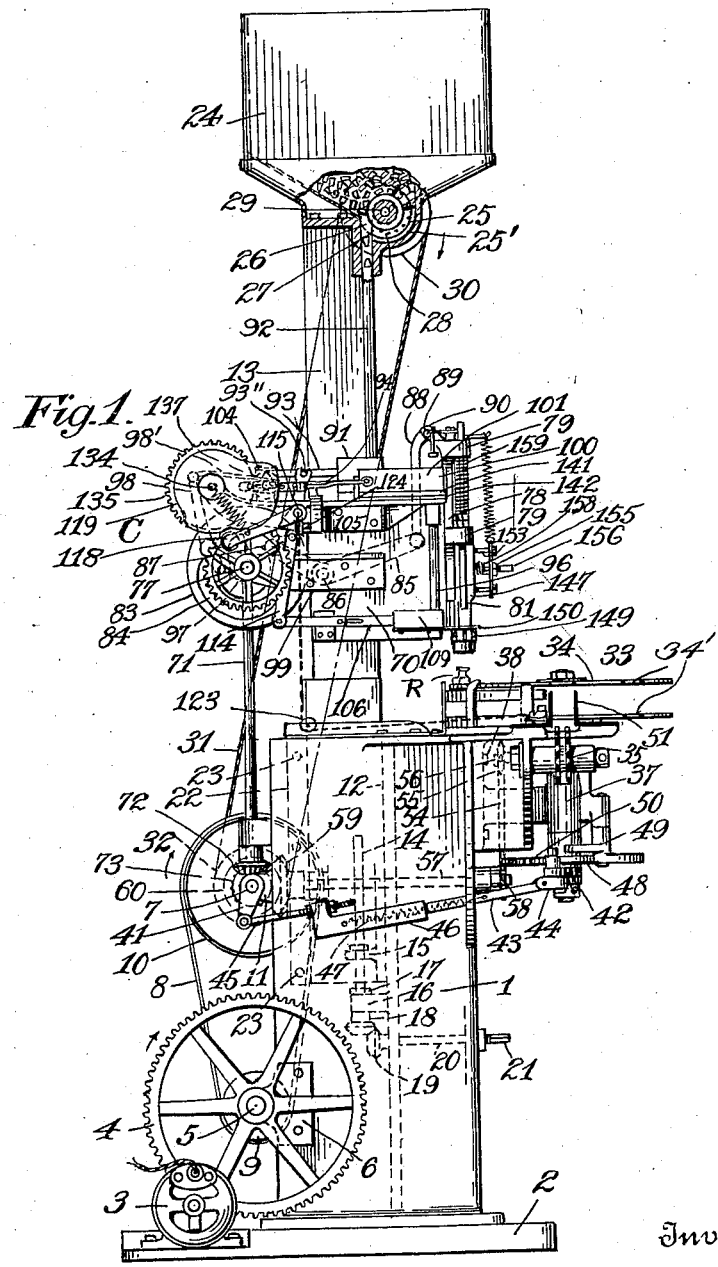
Fig. 1 is a side elevation of a cork feeding and inserting machine embodying the cork feeding and rectifying mechanism.
Figure 2:
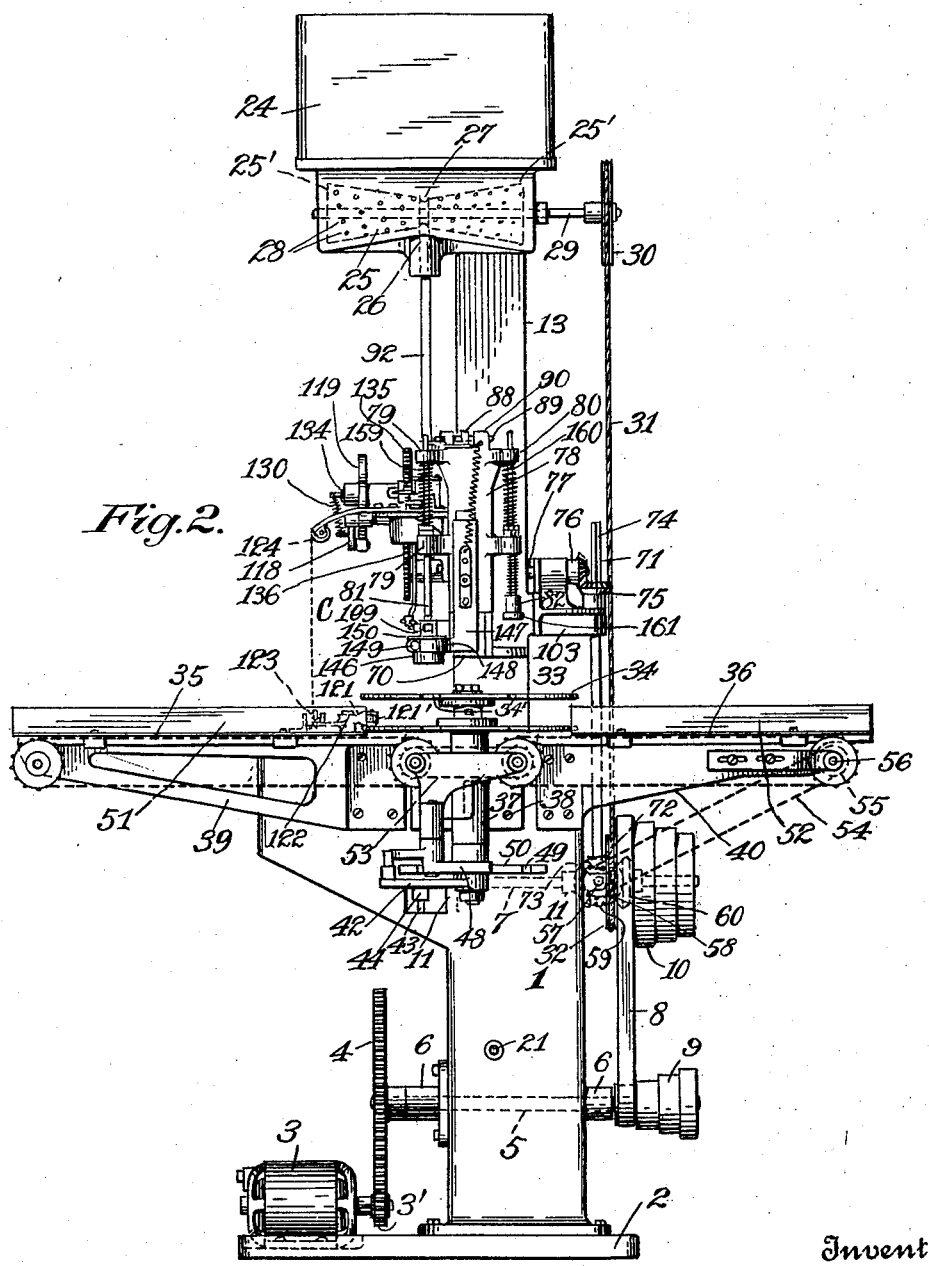
Fig. 2 is a front view of the machine.

Referring particularly to Figs. 1 and 2 of the drawings, the cork inserting machine is shown embodying my invention, which includes a main frame 1 of box form, mounted on a base plate 2, the base being extended to provide a place for a motor 3 having a pinion 3' on the shaft to connect with a spur gear 4 carried by a shaft 5 which forms a part of the driving mechanism, and is located at the lower rear side of the frame 1, in bearings 6—6. By this gear 4 the speed is materially reduced to provide the proper speed to a main shaft 7 by a belt 8 passing over a stepped pulley 9 on the shaft 5 and a companion pulley 10 of the shaft 7, to further regulate the speed of the shaft 7, the latter also being mounted on the frame 1 in bearings 11—11. The frame 1 is open at this rear side, and has a slideway 12 in one wall thereof, to receive the lower end of an upright column 13. This column is fitted to have up and down adjustment by a screw shaft 14 threaded in a lug 15 of the column which forms one bearing for the screw shaft and a bearing 16 on the frame to guide the shaft, and held against end-wise motion by a collar 17 and a gear 18 which meshes with a gear 19 on a cross shaft 20, fitted in the frame to be rotated by its squared end 21 and thereby raise and lower the column for adjustment, the column may be firmly locked into the desired adjusted position by tightening a gib 22 by the bolts 23.

The top of the column carries a hopper 24 of any suitable construction. As shown the hopper is of rectangular proportions, having angular bottom walls to direct the corks to an outlet controlled by a feed roller 25 of such shape to provide a feed of the corks, as they lie thereon to be fed to the center of the roller, to an outlet 26 of the hopper and this in a manner to discharge the corks in a single file, or one at a time, through this opening. This being accomplished by forming the feed roller with a larger diameter at its ends as 25' diverging in a conical form from both ends to the center of the roll at which point a further reduction is provided by an annular groove 27 through which the corks may pass. This feed of the corks to the center of the roller is further aided by spirally arranged projections 28 in the form of an interrupted thread to agitate and urge the corks along toward this discharge outlet 26.

To rotate the roller shaft or an extension 29 of the roller it is provided with a pulley 30 which is driven by a belt 31 from a pulley 32 on the aforesaid main shaft 7.

At the front of the machine a feed table 33 is provided which comprises a rotating head 34 intermittently actuated to receive the articles or other receptacles to be corked into the openings or pockets 34' of the head at one side thereof, the receptacles designated by R being fed thereto by a continuously driven chain belt 35 which carries receptacles by a constant forward action or crowding movement into the openings of the head as such openings are presented, then carried to the positions where, first, the corks are applied and, second, where the finishing impression is given. This will be more fully described hereinafter. After leaving their positions the bottles are carried away from the head by leaving the openings in the head as such openings are rotated to the opposite side of the receiving end to be delivered on a similar chain belt 36 also continuously moving to take the receptacles away to be disposed of in any suitable manner.

This feed table provides a center bearing 37 which carries the rotating head 34 and is bolted to the front of the frame 1 by bolts 38. The chain belts are similarly carried on brackets 39 and 40 bolted to the frame in such a position to make proper connection with the head.

The head, as before stated, is intermittently actuated, this being done by a crank 41 on the shaft 7 which rocks an arm 42 by a link 43 whose connection at the end of arm 42 is by a swivel joint member 44 and at the crank end by a threaded adjustable extension 45 of the link to an intermediate part 46 which forms a slide box for the link part 43 to slide into against a stop to be held thereto by a spring 47. This construction provides for a safety means in case a receptacle is jammed in the head, the link will yield to this blocking of the parts to prevent breakage thereof, the arm 42 carries a pawl 48 to engage notches 49 of a wheel 50 by which the head is rotated intermittently in a manner well understood.

The chains 35 and 36 are continuously driven between guide rails 51 and 52 to guide the receptacles to and away from the head, the chains being connected by a short chain drive 53 at the center just below the head, so the two chains will run in unison and in the same direction over suitable sprockets carried by the frames 37, 39 and 40. This being done by a chain 54 driving sprocket 55 on the shaft 56 and by this means the chains 35, 36 and 53 are driven. The chain 54 receives its motion from the main shaft 7 through a cross shaft 57 having a sprocket 56 at one end to line up with the sprocket 55 for the chain 54, and connected for rotation by a gear 59 at the opposite end of shaft 57 which is driven by a gear 60 on shaft 7 and thereby both feed belts 35 and 36.

From the foregoing it will be apparent the receptacles are fed to the intermittently rotating head on the belt 35 by a continuous forward movement of the receptacles to be received in the pockets of the rotating head, and thereby carried one at a time to the point where the corks are inserted and where the finishing impression is given and stop at these places for such operation to take place due to the intermittent rotation of the head and then pass along to the belt 36 to be removed from the pocket onto the belt, each time the head comes to rest a receptacle is fed by the belt 35 to one of the pockets in the head and a receptacle at that time is being corked and at another station a final setting up of the cork by a second plunger and at still another station a bottle is being removed to the belt 36 to be removed to a receiving table.

The cork feeding and rectifying mechanism, designated in a general way by C, is preferably incorporated with the cork plunger inserting slide mechanism, all of which is mounted in a suitable frame 70 and bolted to the column 13 to have adjustment therewith by the screw shaft 14. This mechanism is connected by a vertical shaft 71 driven by a gear 72 on its lower end by a gear 73 on the shaft 7, the shaft 71 having a keyway 74 at the upper end, to permit the raising and lowering of the column, in a gear 75 having a key therein. This gear 75 meshes with a gear 76 on a cam shaft 77 and provides the driving means for this mechanism, and by this means also the frame 70 is readily removable from the column for any purpose, by the simple removal of a few bolts. The frame 70 reaches forward to properly locate a main slide 78 provided with bearing extensions 79–80 for the reception of two spring pressed plungers 81 and 82 to position with the receptacles as the latter are brought to this location by the rotating head 34.

This main slide is operated in timed relation with the intermittently rotated receptacle positioning head 34 to descend, to the receptacle, and return while the head is at rest, by a cam wheel 83 which has a cam groove 84 of the proper shape. The wheel is of such proportions to furnish a sort of balance wheel effect to carry the plungers past the impression point where the corks are inserted by this slide action.

The slide is connected with the cam by a double ended lever 85 mounted on a short rock shaft 86 in suitable bearings in the walls of the column 13, one end of the lever has a roll 87 to work in the cam groove 84 and the other end of lever connected by a link 88 with the slide by a pin 89 in ears 90 at the top thereof.

Figure 3:
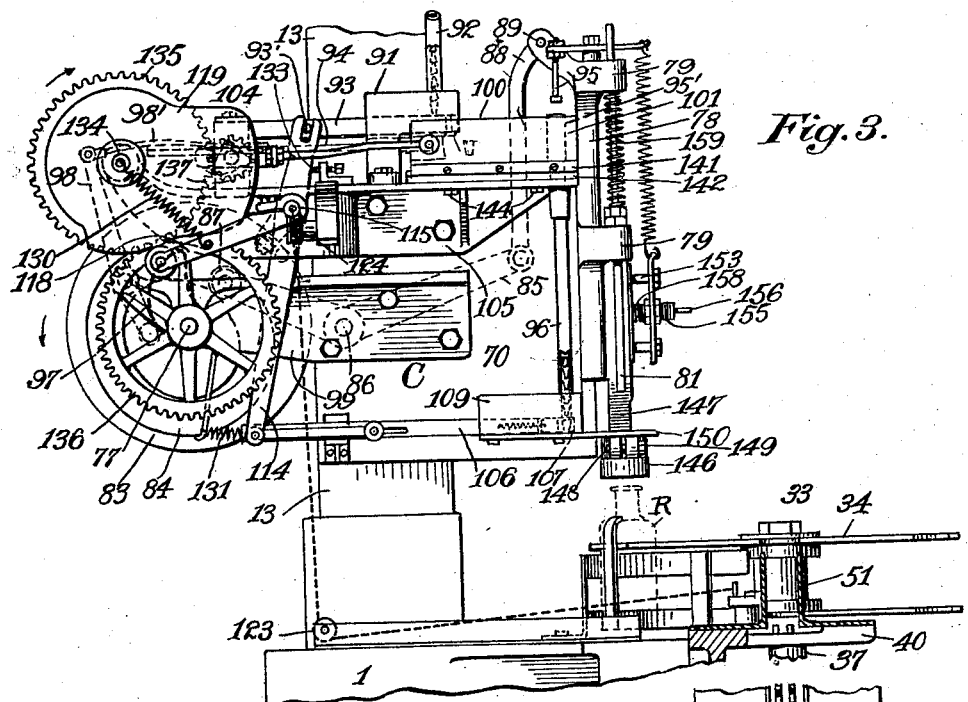
Fig. 3 is an enlarged portion of the showing in Fig. 1.

The corks are led from the hopper 24 to a perforated block 91 located about central of the frame 70 and centrally under the hopper, through a tube 92 serving as a runway through which the corks pass freely with either end of the corks leading down the tube, to rest normally on the top of an ejector slide 93, see Figs. 3, 12 and 18. This slide is of such height when drawn rearward to permit the lowermost cork to drop in front of the slide with the corks above to follow in their order, but checked in their downward progress by a plate 93' just below the slide 93, the slide 93 will now move forward and eject the cork from the plate, and at this time again support the corks in the tube 92 above, and the ejected cork will be dropped from the plate into rectifying chamber 100 formed at the front by the block 91 and with a pair of angularly disposed side walls 101–102 to form a channel, the inner walls of which are slightly curved in cross section, see Fig. 18. The corks due to their conical proportions will be turned to an upright position between these walls of the box, as indicated in dotted lines in this view, that is, they swing into this upright position due to an overbalancing effect since the large end of the corks are engaged by the opposite side walls of this chamber too narrow at this point at the top to allow the larger ends of the corks to drop down through. The conical lower ends of the corks are free to turn downward between these walls to retain this upright position while the corks are shifted further forward in their rectified position in the box by a supplemental slide 94 to a position in the box in line with a plunger 95 carried on the main slide 78, see Fig. 3, the position of the plunger being directly over a tube 96 at the front and under the rectifying chamber. A leaf spring 95' is provided at this position to hold the fork frictionally for the plunger to force it into the tube. This tube is in the nature of a magazine to carry a supply of the rectified corks, before the corks reach this position of the lower tube 96, they are further aided to this righted position and hasten such turning action due to the speed required to operate this mechanism. One wall 101 of the chamber 100 is made to reciprocate thereby agitating the corks, since they are light in weight, and to prevent their slow action in turning to position or adhering to the side walls, for any reason during their forward motion by the slide 94 which has a tapered front face 94' to make contact with the cork and hold it squarely in this forward movement.

To move the slide 94 a cam 97 is provided located on the shaft 77 which operates the slide 94 by to lever 98 mounted on a bracket 99 secured to the frame 70 which is also the bracket in which the shaft 77 has a bearing at one end, the other end taking a bearing in bracket 103 which also provides a bearing for the top end of the vertical shaft 71, the slide 94 is supported at one end in a bearing extension 104 of a shelf bracket 105 which also carries the block 91 and supports the side walls 101 and 102 of the chamber, the front end of the slide 94 slides in the block 91 and is thus guided between the walls of the rectifying chamber and operates to move the rectified corks to the aligned position with the magazine tube 96. The cam 97 is so formed to give a steady forward stroke to the slide 94 and a rapid return movement by connecting the lever 98 by a link 98' and a spring 98'' holds the slide in its rearward position and thereby the lever 98 against the cam.

The tube 96 extends down some distance to provide a magazine to hold a supply of rectified corks, see Figs. 3, 16 and 17; this tube is held at the top end in a hub extension of the bracket 105 and in a slide block 109 at its lower end, from which the corks are removed one at a time to be carried forward to the inserting plunger 81, this being done by a slide 106 which carries a cork holder 107 at its end to receive a cork from the magazine when the slide is in its retracted position. The holder is formed from a one piece strip by being folded upon itself, the folded part extended rearward into a cut 111 in the slide and held therein by a spring 112 fixed to this extended end and to a pin in an opening 113 of the slide, the front ends of the holder being bent into circular shape to hold the cork (see Fig. 16). When the slide is forward the spring 112, by this rearward pull, brings the holder with its circular part against the end of the slide to hold this relation to the slide at all times except when the slide is fully returned, when the holder at the circular part, which is somewhat wider than the slide itself, is engaged in a recess 108 of a block 109 which supports the tube 96 at its lower end and guides the slide in a runway 110 thereof. The recess 108 is at the front of the block and so positioned to stop the holder in alignment with the tube while the slide is withdrawn a little further as shown in Fig. 17, assuring always a perfect register with the tube to receive the cork into the holder, which may now be carried forward by the slide into alignment with the plunger 81, the cork when in this forward position, it will be noted, will drop into a holder, see Fig. 11, which will be hereinafter described.

This slide 106 is operated in timed relation with the movement of the inserting plunger by connections such as a lever 114 loosely mounted on a tubular rock shaft 115 in a bearing of the shelf bracket 105, and operated by a clutch engagement with an arm 116 keyed to the shaft but slidably connected by a rod 117 passing through the tubular shaft 115; one end of this shaft 115 has a cam arm 118 to rock the shaft by a cam 119 and thereby the arm 116, and the arm 114, when the clutch arm 116 is shifted inward to engage with a clutch pin 114' of the arm 114. This clutch connection between the arms (see Fig. 4) is effected by a receptacle as it is fed from the first station 120 where the receptacle is received from the belt 35 into the pocket of the head 34 when rotated to the position of the inserting plunger 81. The receptacle in making this passage contacts with an arm 121 having a roll 121' which is engaged by the receptacle rocking the arm on its pivot 122; the other end of the arm has a chain connection passing over pulleys 123 and 124, the latter in line with a connection 125 fixed to the rod 117 which passes through a plate 117' acting as a washer bearing against the arm 116; the plate which is adjustable by an adjusting nut 126 and locked by a check nut 126', a spring 127 interposed between the arm and the end of the tubular shaft holds the arm 116 in this outward position (see Fig. 19) and when brought forward by the pull of the chain, as stated, a pin 116' of the arm 116 will engage over the end of the pin 114' of the arm 114, this taking place when the receptacle is being carried past the arm 121 by rotation of the head 34. This is done to prevent a cork being fed from the magazine to the plunger 81 should there be no receptacle in the holder.

The pin 116' has a spring catch plate 128 (see Fig. 19a) that locks over a lip 129 of the pin 114' to hold the clutch arms together during the entire stroke of the arm 116 except at the end of the return stroke of the arm 116 swinging rearward further than the arm 114, both arms being returned by springs, the arm 116 being returned through the spring 130 on arm 118, and the arm 114 by a spring 131 attached to the slide 106 and a pin 132 on the frame bracket 99. The arm 114 at this time resting against an adjustable stop screw 133 on the shelf bracket 105, the clutch arms at this point being released by the spring 127.

The arm 114 at its upper end is slotted to make connection with the slide 93 by a pin 93''. The slides 93 and 106 work at the same time but in opposite directions, while the slide 106 is delivering a cork to the plunger 81 the slide 93 is releasing a cork from the tube 92, by this means the clutch connection of the arms 114 and 116 operated by the receptacles control the feed delivery to the rectifying chamber and the plunger 81.

The cam 119 is mounted on a shaft 134 in the bracket 105, and driven by a gear 135 on the shaft 134 by a gear 136 on the shaft 77, the gear 135 also drives a pinion 137, see Fig. 9, mounted on the side of the extension 104, to provide the motion to reciprocate the wall 101 as before stated, by a three winged cam 138 operating between pins 139 to shift at a high speed the link 140 connected to this wall 101, this wall being fitted with a dovetailed slide portion 141 to an adjustable base 142 having a dovetailed fit therewith. The side walls are adjustable to and away from each other by screws 143 (see Fig. 13) on side wall 102, and the base portion 142 by screws 144 under the shelf bracket. Between the walls 101 and 102 a slot 145 is provided in the shelf 105 through which corks of undersize diameter or broken particles may fall out of the rectifying chamber should such corks be fed thereto (see Fig. 14) to prevent such imperfect corks being mixed with the perfect righted corks in the magazine 96.

The slide 106 carries the cork forward to the plunger 81 of the main slide 78 to be forced into the receptacle; before this is done however, the cork is dropped into a holder 146, before referred to, provided with spring pressed projections to prevent the cork from dropping through the holder. This holder is carried by a supplemental slide 147 to receive the cork prior to forcing it into the receptacle. The supplemental slide moves with the main slide 78, but is prevented from lifting to the full height of the main slide movement by an elbow portion 148, in which the holder 146 is clamped by a clamp screw 149; this elbow engages the underside of an overhanging bracket 150 on which the slide 106 is supported. The cork, as stated, is dropped out of the holder 107 of the slide 106 as it reaches the plunger 81 and drops into the holder 146 freely to be followed by the descent of the plunger 81.

The supplemental slide is frictionally carried by the main slide, to permit the main slide to make its full stroke up and down. The supplemental slide 147, however, is limited in traveling with the main slide by contact with the bracket 150 in the upward stroke, and on the down stroke by the holder 146 when this part makes contact with a receptacle. By this means also the receptacle is positioned centrally of the holder 146 by a conical entrance opening 146', see Fig. 11, and the friction between the slides on the downward movement of the slides applies a constant pressure to the top of the receptacle within the holder during the descent of the plunger 81 to force the cork into the receptacle. This frictional contact between the slides is produced by a tension member 151 in the form of a disc which makes contact with the face of the runway 152 in the main slide, the beveled sides of which guide the supplemental slide, a pair of studs 153 fixed to the latter extending some distance forward and carry a plate 154 bored and threaded to receive an adjustable threaded sleeve 155 also bored for a plunger 156 which engages the disc 151 by entering a recess in the disc, the plunger having a shouldered portion 157 for a compression spring 158 to exert a pressure against the disc between the shoulder and the adjustable screw sleeve 155, thereby to apply more or less tension to the disc and regulate the friction of the slides. To one end of the plate 154 and an arm of the frame 78 a spring 153' is attached to give a sort of balancing effect to the slide to overcome the weight of this slide.

Figure 4:
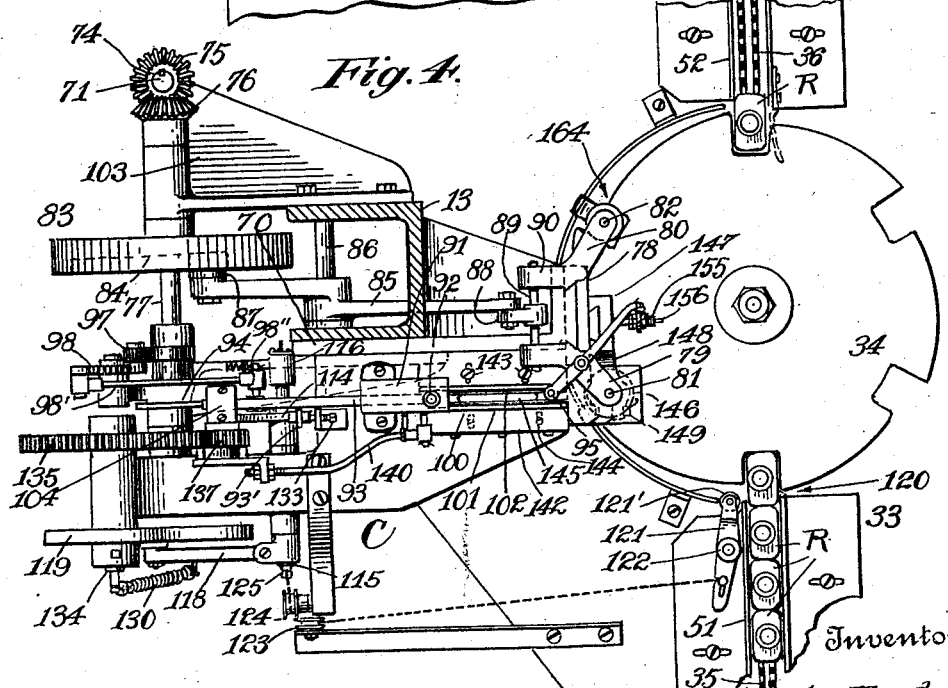
Fig. 4 is a plan view of that part shown in Fig. 3.

The plunger 81 has a compression spring 159 which ordinarily is not required since the plunger could be fixed to the slide 78 to insert a cork to a certain position within the neck of the receptacle, but should a cork be prevented from entering the receptacle properly the spring will yield to such conditions and prevent breakage or injury to the parts; the plunger 82 is similarly provided with a spring 160 to provide a yielding action of this plunger, the lower end of this plunger having a guide piece 161 with a flared open end yieldingly mounted to rest on and fit over the head of the receptacles by a spring 161' to guide the plunger into central position with the receptacle; this plunger gives a second closing or finishing impression to the cork previously inserted by the plunger 81 at the plunger position as at 164 in Fig. 4.

In Figs. 20 to 25 inclusive, a modified form of the device is shown wherein a positive cork positioning means is employed in the rectifying chamber. The corks are not dropped into the chamber by being pushed from the shelf 93' as is the case heretofore described; the cork in this instance is discharged into the chamber by being tilted to a longitudinal position, then dropped into the chamber whereby the further turning to the righted position requires but a short swing of the cork in either direction after engaging with the tapered channel walls. As shown instead of depending upon the gravity of the corks to rotate a full half turn as before to the upright position, the corks are here carried forward on a movable shelf under a tension plate to hold fixed the upper end of the cork while the slide returns and thereby tilts the cork to drop into the chamber in approximately a horizontal position so only a quarter turn is necessary to right itself.

The tube 92 is fitted into a holder block 170, the end carrying a spring pressed shoe 171, when the ejector slide 172 moves forward, in this case a greater distance than the slide 93 heretofore described, and carries the cork forward to the front end of the shoe by a plate 172' fastened to the top of the ejector the front end being provided with an opening through which the cork drops when the ejector is in the retracted position and under the tube 92, the cork dropping to a plate 173 slidably carried by a pusher slide 174 to move with this slide a limited distance and held from further movement with the slide 174 by a bent portion 175 surrounding the slide 174, both the ejector slide 174 with the plate move together to the front end of the shoe, as in Fig. 21, when the plate with the bent end 175 will contact with the bearing block 176 in which both the slides 172 and 174 are fitted to move, the slide 174 continuing forward to deliver a cork previously dropped before it, the cork being acted upon to be positively tilted over to drop between the side walls 101 and 102, is caught between the spring pressed shoe 171 and the plate 173 which in its return motion with the slide 174, as in Fig. 22, has tilted the cork to such position to drop it from the plate in a longitudinal position between the tapered side walls to swing into position with the smaller diameter downward, this swinging of the cork being aided by virbrating the wall 101, as shown in Fig. 20, by a cam disc 200 having a serrated periphery which engages a right angle rock lever 201, one arm of which has a roller riding the cam, and the other arm 202 provided with a link 203 to join the wall 101 as in the previous case to give the wall a vibrating action. It will be seen from the foregoing no matter which end of the cork is headed forward or rearward as it leaves the plate 173 as said plate is drawn from under the spring shoe 171, the cork will swing into position. The plate 173 is normally held in position to travel with the slide by a compression spring 177 which holds the plate forward, the spring being located between the bent end 175 of the plate and a pin 178 on the side, the full forward motion of the plate being determined by a pin 179 therein moving in a slot in the slide and engaging a front plate 180, which has the front side thereof tapered to fit the tapered cork. When the cork has been shifted forward ready to be forced into the magazine tube 96, as in Fig. 21, by the plunger 183, a tension spring, preferably a leaf spring 182 is provided at the front end of the side wall 101 whereby a tension is provided to hold the corks in position to be acted upon by the plunger 183 to be forced into the receiving end of the magazine tube 96.

The plunger 183 as seen in Figs. 23 and 24 is provided with a switch 184 by means of which the machine may be stopped, by breaking the circuit at the switch of the line to the motor, when a jam or obstruction occurs at the receiving end of the magazine, by a cork not being properly positioned to be forced into the magazine by the plunger, the switch will be opened. The plunger is adjustably located on the main slide 78, on a bracket 185, for up and down adjustment; a sleeve 186 of the bracket is provided with a disc 187 fixed to an insulated collar 188 fast to the sleeve.

This disc forms one part of the switch and above the disc is a companion switch member 189, split at one end and provided with a binding screw whereby it is clamped to an insulated collar 190 pinned to the plunger stem to travel therewith, at the top of the stem a cross piece 191 is attached extending each side of the stem to which springs 192 are attached, exert a downward pressure to the plunger and bring the switch members together, when, however, the plunger is descending with the main slide to force a cork into the magazine, and prevented by the blocking of a cork in its proper descent into the tube, the plunger will yield to this action and separate the switch members and thereby break the circuit, and stop the motor which is in connected circuit by the terminals 193 and 194. The switch member 189 is further provided with a pawl 195 of insulated material in the form of a weighted finger piece 196 and serves to hold the switch members apart by dropping downward onto the disc 187 which holds the switch members open, until the arm is again lifted manually.

The ejector slide 106 in Fig. 25 shows a gripper with spring pressed jaws 107' fastened to a block 106', the top of which serves to close the outlet of the magazine tube 96 when the slide is forward.

In Fig. 8, corks of even diameter their entire length, are fed in a similar manner to that described in connection with Figs. 1 to 20, the difference being the corks may drop vertically when the ejector moves the cork from the plate 93' to drop in an upright position in a limited space between the end of the ejector 93 and the tension spring 95' to the bottom of the chamber 100 between the side walls, which in this case may be of equal width from top to bottom, and the chamber may be much shorter in length so the corks can be transferred by a short stroke of the slide 94 in this upright position to be impinged by the spring plate 95' at the entrance to the magazine tube to be inserted therein by the plunger 183; the opening between the side walls in the supporting shelf may be somewhat less than the diameter of the corks to prevent them from dropping through.

What I claim is:

1. In a cork feeding and inserting machine, a hopper, rectifying means and a passageway from the hopper connecting with the rectifying means, said means having side walls one of which is movable relative to the other lengthwise thereof and an outlet leading to a magazine to receive the rectified corks, and means to force the corks into the magazine.

2. In a cork feeding and rectifying mechanism, a chamber and a magazine, said chamber having tapered side walls to provide a channel of greater width at the top than at the bottom thereof one of which walls is movable relative to the other, an inlet and an outlet to the said chamber, means to admit one cork at a time to the chamber from a source of supply, a plunger, means to advance the cork to the outlet of the chamber, and means to hold the cork in this position to be acted upon by said plunger to force the same into the magazine.

3. In a cork feeding and rectifying mechanism, a chamber having tapered side walls to provide a channel of greater width at the top than at the bottom, one of which walls is movable lengthwise thereof relative to the other, an inlet and an outlet to said chamber, means to admit one cork at a time to the chamber from a source of supply, means for vibrating one wall of the chamber to aid and hasten the turning of the cork to a predetermined position, means to advance the cork to the outlet of the chamber, a plunger, and means to hold the cork at the outlet to be acted upon by said plunger to force the same into the magazine.

4. In a cork feeding and rectifying mechanism, a chamber having tapered walls to provide a channel of greater width at the top than at the bottom, an inlet and an outlet to said chamber, means to admit one cork at a time to the chamber from a source of supply, means to vibrate a portion of said chamber to bring the corks to an upright position, means to advance the cork to the outlet of the chamber, means to hold the cork impinged at the outlet, means to discharge the corks through the outlet into a magazine, a plunger, and means for removing the lowermost cork from the magazine to a cork inserting plunger.

5. In a cork feeding and rectifying mechanism, a chamber having tapered side walls to provide a channel of greater width at the top than at the bottom, one of said walls being movable relative to the other lengthwise thereof, an inlet to the chamber from a hopper, an outlet from the chamber to a magazine, means to admit one cork at a time to the inlet and means to aid the turning of the cork to an upright position by reciprocating one wall of the chamber, means to adjust the walls to increase or decrease the channel width between said walls, and an elongated opening in the channel support located between the walls through which undersized corks or particles may be freely discharged before reaching the magazine.

6. In a machine for feeding and inserting corks, comprising a hopper, a magazine, a rectifying chamber between the same having runway connection, said chamber provided with tapered side walls to form a channel between said walls of greater width at the top than the bottom thereof, to effect a turning of the cork to a predetermined position, means to reciprocate one wall of the chamber to assist the turning action, means to support the lowermost cork in the runway, and means to open the runway, said means adapted to both prevent the descent of more than one cork at a time from the runway, and move the lowermost cork into the chamber, means to move the cork to the discharge outlet of the chamber in alignment with the magazine, a plunger, and means to impinge and hold the cork in said aligned position to be acted upon by the plunger to force the same into the magazine.

7. In a cork feeding and inserting mechanism, comprising a hopper, and a rectifying chamber, a runway for feeding the corks from the hopper to the chamber, said chamber having tapered side walls adapted to turn the corks to a predetermined position, a magazine connected with the chamber provided with an inlet and an outlet, an ejector for delivering a single cork from the runway into the chamber, a plunger, means to shift the cork forward in said chamber in its predetremined position into alignment with said plunger to be there impinged and later acted upon by said plunger to force the same into the magazine, and means to eject a cork from the outlet of the magazine, to a cork inserting plunger, the latter in position to force the cork into a receptacle, means to move a receptacle to the plunger, both said ejectors being connected by a lever to operate alternately, one to feed a cork into the chamber and the other to feed a cork to the receptacle to be corked, and means to actuate the lever of the ejectors, comprising an actuator carrying a movable clutch member adapted to engage said lever to move with the actuator and means to shift the clutch member into engagement therewith, controlled by a receptacle engaging said means during the movement of the receptacle to the inserting plunger.

8. In a cork feeding and inserting machine, a hopper, a rectifying chamber having a runway connection, means connected with the runway to feed corks to the chamber, an ejector adapted to close the runway and force a single cork from the runway in one stroke into the open channel of the chamber wherein the corks are brought to upright position by tapered walls of the chamber, a magazine, a second ejector to control the magazine, means for shifting the corks along the chamber into alinement with the magazine to receive the corks, means connecting both said ejectors including a double ended rock lever whose ends pivotally connect with said ejectors to alternately eject a cork from the runway into the chamber and a cork from the magazine to a cork-inserting plunger, means to rock said lever including a continuously moving actuator having a clutch-engaging member adapted to engage and disengage the rock lever, and means to drive the actuator.

9. In a cork feeding and rectifying mechanism, a chamber having tapered side walls to provide a channel of greater width at the top than at the bottom, an inlet and an outlet to said chamber, means to admit one cork at a time to the chamber from a source of supply, and means for automatically reciprocating one wall of the chamber to roll the cork between the side walls of the chamber and aid in bringing the cork to a predetermined position, and means to move the cork forward in the chamber into alinement with the outlet.

10. In a cork feeding and inserting machine, driving means, means to position a receptacle, means to feed corks to the receptacle, and means to insert the corks therein including a hopper, a rectifying chamber, a magazine, a runway connecting the hopper and the chamber, an ejector to feed the lowermost corks from the runway into the chamber, said chamber having tapered side walls one of which is reciprocated to aid in bringing the corks to a predetermined position, a slide to advance the corks along the chamber into alinement with the entrance of the magazine located under and at the outlet end of said chamber, a yieldable plunger, a yieldable member to hold the cork in said alined position to be later acted upon by the yielding plunger to force the cork into the magazine, a reciprocating slide carried by the cork inserting means, said latter means being provided with a plunger to insert the corks into the receptacle and which inserting means carries said yielding plunger, a normally closed electric switch between the driving means and said plunger adapted to be opened on the yielding action of said plunger to stop the driving means.

11. In a cork rectifying mechanism, comprising a hopper, a rectifying chamber, and a magazine connected by a runway leading from the hopper to the chamber having tapered side walls in which the corks are brought to a predetermined position, means to eject a cork from the runway, means to support the cork and having a relative movement with the ejector and means to exert a pressure on the cork to hold the same to the movable support at the end of its ejected movement, including a spring pressed plate, said supporting means arranged to travel forward with the ejector, and on the return thereof to tilt the cork between the plates to an approximately longitudinal position preparatory to dropping the same between the side walls of the chamber, to be there brought to a predetermined position, a pusher to move the cork so positioned between the side walls into alinement with the entrance of the magazine, means to hold the cork under tension at the magazine entrance and means to force the cork into the magazine.

12. In a cork rectifying mechanism, a hopper, a magazine, a rectifying chamber having tapered side walls one of which can reciprocate to bring the corks to a predetermined position, a runway connecting hopper and magazine to feed corks to the magazine, an ejector adapted to move a cork from the runway, a spring pressure plate, and a supporting plate movable with the ejector to support the cork during the forward movement with the ejector to locate the cork under the spring pressure plate, said supporting plate arranged on its rearward stroke to tilt the cork to drop between the side walls in approximately a longitudinal position whereby to hasten the action in bringing the cork to said predetermined position.

13. A cork feeding and inserting machine, comprising an intermittently rotatable receptacle carrier having a plurality of pockets that when the carrier is brought to rest will simultaneously receive at one station from a source of supply receptacles to be corked and to have delivered the receptacles at a cork inserting station and to permit a finishing operation on an inserted cork at another station and arranged to deliver the corked receptacle to a receiving means at another station, means to drive the carrier, means to feed the corks at the cork inserting station including a hopper, a rectifying chamber, a magazine, a plunger arranged to insert corks into the receptacles, a runway leading from the hopper to the rectifying chamber provided with tapered side walls to turn the corks to a predetermined position, an ejector to remove a cork from the runway to the chamber, a pusher to feed the corks forward in said chamber into alinement with the magazine, a plunger carried by the cork inserting means, a tension member to hold the corks in said position to be acted upon by said plunger that will force the cork into the magazine, an ejector to feed a cork from the magazine to the cork inserting plunger, and a cork holding member to hold the cork in said position to be acted upon by the cork inserting member.

14. In a cork feeding and inserting machine, means to support a receptacle, driving means, means to feed a cork to corking position with relation to receptacle, means to insert the cork into the receptacle, a hopper, a rectifying chamber, a magazine, located under and at the end of said chamber, a runway leading from a hopper into the chamber, an ejector to remove a single cork from the runway into the chamber in which the corks are brought to a predetermined position, a pusher to move the cork forward into the chamber into alinement with the entrance of the magazine, a tension member to hold the cork in said alinement position, yieldable means to force the cork into the magazine, means to eject the cork from the magazine, yieldable means to force a cork into the receptacle, a reciprocatable slide by which both said yieldable means are carried, an electric switch connected with the yieldable means that forces the corks into the magazine, said switch being normally closed and arranged to be opened on the yielding action of its connected yielding means, driving means electrically controlled to reciprocate the slide when the switch is closed, said driving means being arranged to be stopped by the opening of the switch from the yieldable means when a cork is jammed or prevented from properly entering the magazine.

15. In a cork feeding and inserting machine, means for inserting the corks into the receptacles, means to support a receptacle, means to feed a cork to corking position with relation to the receptacle, including a hopper, a rectifying chamber, a magazine, and an ejector to remove a single cork from a runway leading out of the hopper into the chamber, a pusher to move the cork forward in the chamber into alinement with the entrance of the magazine located under and at the end of said chamber, a tension member, carried by the chamber to hold the cork in said position, a plunger carried by the cork inserting means to force the cork into the magazine, means to eject a cork from the magazine and carry the same to a cork inserting plunger to force the cork into the receptacle, both said plungers carried by the cork inserting means, said means including a main slide, means for moving the same, a supplemental slide frictionably carried by the main slide and having a limited movement with relation thereto, a cork receiving member attached to the same, one end of which receives the corks and the other end provided with a flaring outlet adapted to engage the receptacle to be corked and center the same with relation to the plunger, and means between the entrance and the outlet to prevent the corks from freely passing through until the inserting plunger forces the cork into the receptacle, another plunger carried by the main slide in position to apply a finishing impression to a corked receptacle previously corked, and simultaneously therewith.

16. In a cork feeding machine, comprising a hopper, a rectifying chamber and a magazine, a runway leading from the hopper and connected with the entrance to said chamber to lead the corks thereto with either end of the corks leading in the movement, a shelf to support the lowermost cork in the runway, means to move the cork into the chamber, said chamber having tapered side walls, one wall of which is slidably mounted for reciprocation and means to reciprocate the same to turn the corks to a predetermined position, viz., with the small tapered ends down, means to move the corks in said chamber to a discharge position from the chamber to be there held in line with the entrance of the magazine to receive the corks so positioned and means to force the corks therein.

17. In an automatic cork feeding mechanism, comprising a hopper, a rectifying chamber and a magazine, a runway to lead the corks from the hopper to the entrance of the chamber, through which the corks pass by gravitation, either end of the corks leading in the movement, a shelf to support the lowermost cork in the runway and located in the chamber, means to move said cork into the chamber, and close the runway, said chamber having tapered side walls, one of which is movable for reciprocation to aid in bringing the corks to their righted position, means to reciprocate the same, means to move the cork forward in the chamber into alignment with the entrance of the magazine located under the chamber, means to impinge the cork at said position, and a plunger to force the corks into the magazine.

18. In a cork feeding mechanism, comprising a hopper, a rectifying chamber and a magazine, means to lead the corks from the hopper to the entrance of the chamber, including a vertical tubular runway to guide the corks with either end thereof leading in the movement, a shelf in the chamber to support the lowermost cork in the runway, means to move said cork into the chamber, said chamber having tapered side walls, one of which is movable for reciprocation and means to reciprocate the same to bring the corks to a predetermined position, means to move the corks forward in the chamber into alinement with the entrance of the magazine located under the chamber to receive the rectified corks from said alined position, through an elongated opening located in a support for the chamber between the side walls and extending the full length thereof through which cork particles and undersized corks may be discharged before reaching the magazine, and means to force the alined and rectified corks into the magazine.

19. In a cork feeding and inserting machine, a hopper, a rectifying chamber, means connected with the hopper to feed the corks to the chamber, including a runway from the hopper, said chamber having tapered side walls one of which is movable for reciprocation to aid in bringing the corks to their righted position, means to reciprocate the same, an ejector adapted to close the runway and force a single cork therefrom in one stroke thereof into the open channel of the chamber wherein the corks are brought to an upright position, means for shifting the corks along the chamber into alinement with an inlet of a magazine to receive the corks, an outlet of the magazine which is also controlled by an ejector, means including a double ended lever to move the ejectors and connecting both said ejectors, a movable actuator controlled by a driving mechanism and having a clutch engaging member adapted to make connection with the ejector connecting means to move therewith and means to actuate the clutch member including a carrier to convey a receptacle to be corked to corking position, and means to actuate the clutch engaging member to make clutch connection with the ejector connecting means during and by said conveyance of the receptacle to corking position.

Signed at New York on this 17 day of February, 1927.

CHARLES R. FREDSELL.